United States Patent [19]
Christopherson

[11] 3,919,832
[45] Nov. 18, 1975

[54] MOWER AND DISCHARGE APPARATUS THEREFOR

[75] Inventor: Herman P. Christopherson, Burnsville, Minn.

[73] Assignee: The Toro Company, Bloomington, Minn.

[22] Filed: Aug. 2, 1974

[21] Appl. No.: 494,169

[52] U.S. Cl. ............................... 56/320.2; 56/202
[51] Int. Cl.² .......................................... A01D 35/26
[58] Field of Search ....... 56/320.1, 320.2, 202, 255, 56/11.4

[56] References Cited
UNITED STATES PATENTS

| | | | |
|---|---|---|---|
| 3,729,911 | 5/1973 | Dahl et al. | 56/320.2 |
| 3,760,572 | 9/1973 | Marion et al. | 56/320.2 |

FOREIGN PATENTS OR APPLICATIONS

| | | | |
|---|---|---|---|
| 106,617 | 7/1965 | Norway | 56/320.2 |

Primary Examiner—J. N. Eskovitz
Attorney, Agent, or Firm—Merchant, Gould, Smith, Edell, Welter & Schmidt

[57] ABSTRACT

A housing for a rotary lawn mower utilizing a cutting blade mounted for rotation on a vertical axis, the housing having a top wall and a depending circumferentially extending skirt. The top wall is formed to provide the top and side wall portions of a discharge chute which extends tangentially with respect to the skirt and angularly upwardly with respect to the top wall of the housing. A housing portion has a generally horizontal wall which underlies the top wall of the discharge chute and defines a bottom wall surface of the chute. The housing portion has a vertical wall which depends from the horizontal wall and cooperates with the housing skirt to define a cylindrical inner wall surface around the path of rotation of the blade and extending upwardly from the plane of the blade.

5 Claims, 5 Drawing Figures

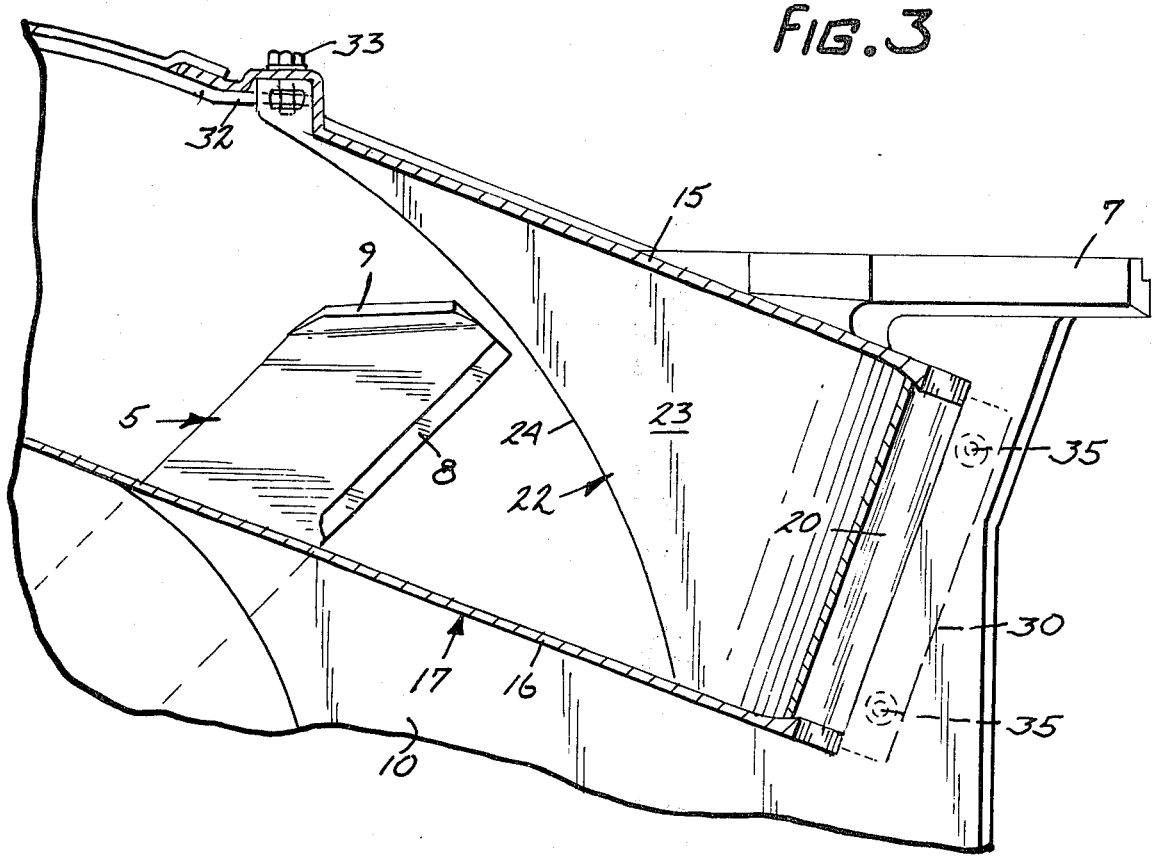
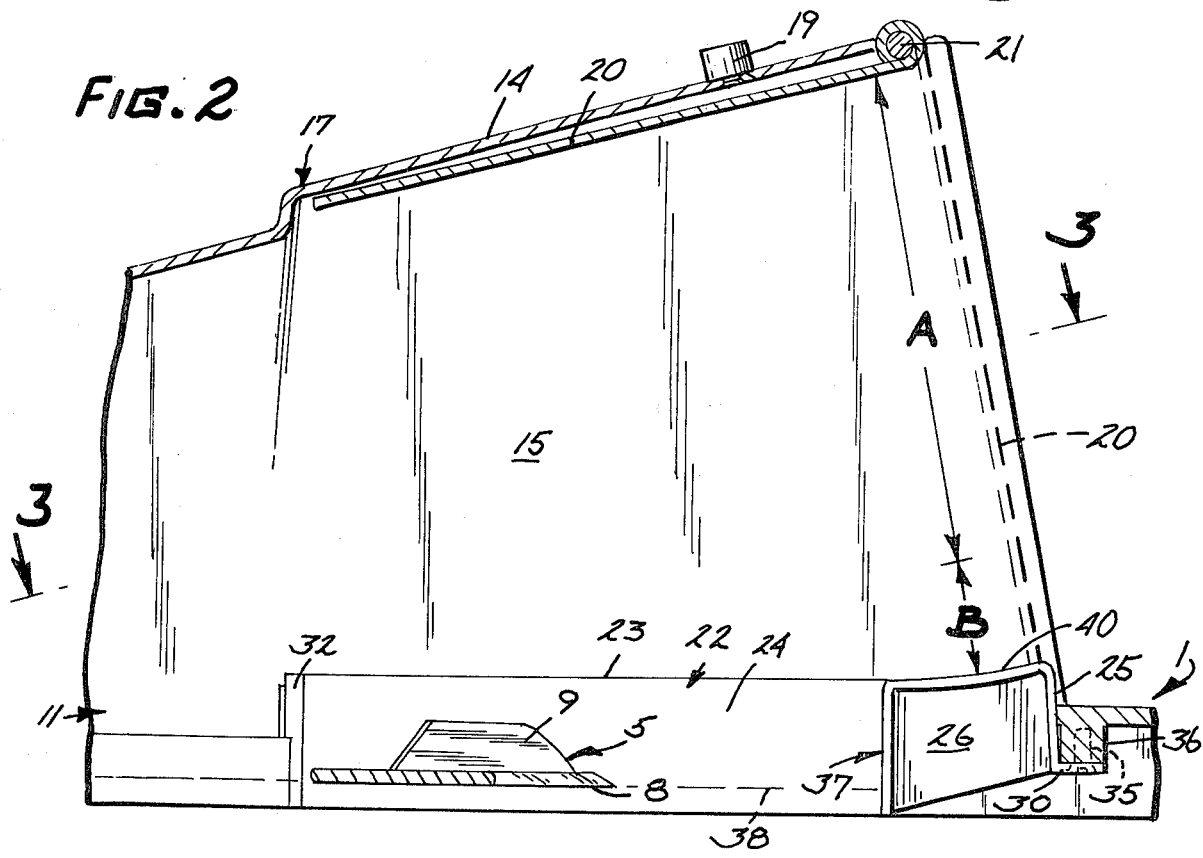

MOWER AND DISCHARGE APPARATUS THEREFOR

BACKGROUND OF THE INVENTION

This invention relates generally to rotary lawn mower construction, and more particularly to improvements in the design of cutting blade housings which provide for more complete discharge of grass clippings and like material into a receptacle therefor.

Heretofore, in mowers having discharge chutes which direct the clippings angularly upwardly with respect to the housing, plugging of the discharge chute and dribbling of clippings to the ground has occurred, particularly when the grass is long, thickly groomed and moist. To overcome choking or plugging of the discharge chute and dribbling of clippings to the ground, the cutting blades and the engines operating the same have been required to rotate at relatively high speeds, with consequent early wear and a high noise factor from both engine and cutting blade.

SUMMARY OF THE INVENTION

An important object of this invention is the provision of a mower including a housing having a tangential and angularly upwardly extending clippings discharge chute, the same having a portion which promotes smooth and thorough discharge of clippings to a receptacle with a minimum of dribbling of the clippings to the ground.

Another object of this invention is the provision of a mower housing as set forth, which provides for efficient discharge of clippings at a substantially reduced speed of rotation of the cutting blade.

To these ends, I provide a mower housing for a rotary cutting blade rotating on a generally vertical axis, the housing having a top wall and a circumferentially extending skirt depending from the top wall, the top wall having a portion extending generally tangentially relative to the skirt and angularly upwardly from the top wall to provide the top and side walls of a discharge chute for grass clippings. The housing further includes a second portion disposed in downwardly spaced relation to the top wall of the discharge chute, the second portion having a generally horizontally disposed wall which defines the bottom wall surface of the discharge chute, and an inner vertical wall depending from the generally horizontally disposed wall and cooperating with the skirt to define a cylindrical wall surface radially outwardly of the path of rotation of the blade, the cylindrical wall surface extending upwardly from the plane of the blade. In one embodiment of the invention, the second portion of the housing comprises an insert element having means for mounting the same within the housing. Further, in at least one embodiment, the horizontal wall portion of said second portion defines an upper surface portion which curves angularly upwardly and toward the discharge end of the discharge chute, for close wiping engagement with a closure member pivotally mounted in the discharge chute.

DESCRIPTION OF THE DRAWINGS

FIG. 2 is an enlarged fragmentary section taken on the line 2—2 of FIG. 1;

FIG. 3 is a horizontal section taken generally on the line 3—3 of FIG. 2;

DETAILED DESCRIPTION OF THE PREFERRED EMBODIMENT

Figure 1:
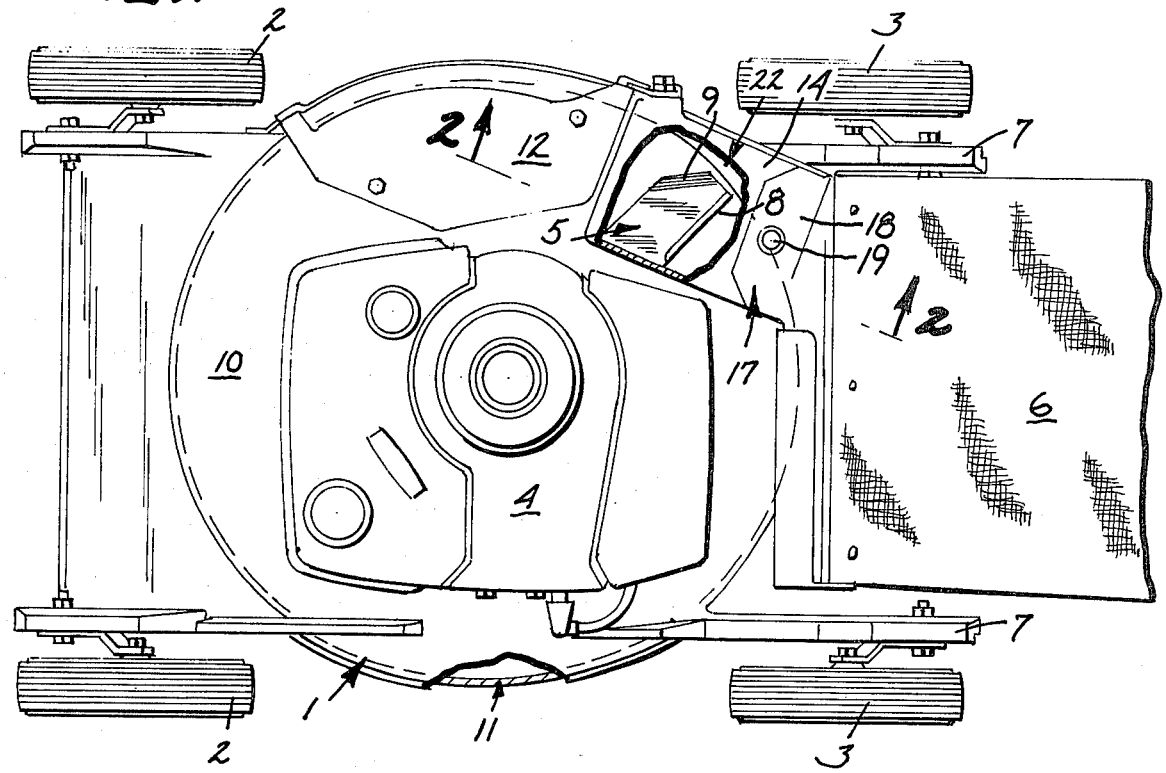
FIG. 1 is a fragmentary view in top plan of a rotary lawn mower including the improvement of this invention.

In the drawings, a rotary lawn mower is shown as including a housing, indicated generally at 1, front and rear supporting wheels 2 and 3 respectively, journaled at the front and rear end portions of the housing 1, a conventional internal combustion engine 4, an elongated cutting blade 5 conventionally mounted on the drive shaft, not shown, of the engine 4, and a bag or like receptacle 6 mounted on the rear end portion of the housing 1 for reception of grass clippings or other material from the interior of the housing 1. The mower is adapted to be moved over the ground by means of the usual handle, not shown, but having front end portions that are bolted or otherwise rigidly secured to mounting flanges 7 adjacent the rear wheels 3, in the usual manner. The cutting blade 5 is formed at its opposite ends, one of which is shown, with a cutting edge 8 and an upturned flange or sail 9 for cutting grass and generating a circumferentially and upwardly moving current of air within the housing 1.

The housing 1 comprises a top wall 10 and a circumferentially extending skirt 11 depending from the top wall 10, and further includes a removable shield portion 12 secured to the top 10 by nut-equipped screws or studs 13. The top wall 10 further includes a portion that extends generally tangentially relative to the skirt 11 and angularly upwardly toward the rear end of the housing 1, to provide a top wall 14 and opposite side walls 15 and 16 of a discharge chute indicated generally at 17. The discharge chute 17 is disposed to discharge clippings generally rearwardly into the bag or receptacle 6, the bag 6 being provided with a bracket 18 having an opening therein for reception of an anchoring pin 19 extending generally upwardly from the top wall 14 of the discharge chute 17. Other means, not shown, are provided for releasably locking the bag 6 in clipping receiving position. The discharge chute 17 further includes a generally rectangular plate-like closure member 20 that is pivotally secured at its upper end to the outlet end portion of the discharge chute 17, as indicated at 21 in FIG. 2, for movements between an open position in close underlying relationship to the chute top wall 14, as indicated by full lines in FIG. 2, and a closed position as shown fragmentarily in FIG. 3, and by dotted lines in FIG. 2.

An important portion of the housing 1 is disposed in underlying spaced relation to the top chute wall 14, and, in the embodiment of the invention illustrated, is in the nature of an insert element, indicated in its entirety at 22. It will be appreciated that the insert element 22 might be an integral part of the housing 1, but for ease of manufacture, the same is molded as a separate element, and assembled in the housing as will hereinafter be described. The insert element 22 is formed to provide a generally horizontally disposed top wall 23, an inner arcuate wall 24 that depends vertically from the top wall 23, a generally vertically disposed outer end wall 25, strengthening ribs 26 and 27, and gussets 28 that impart strength and rigidity to the element 22.

Means for mounting the insert element 22 in its operative position comprises a mounting lug 29 at the front end of the insert element 22 and a mounting flange 30 projecting rearwardly or outwardly from the outer end wall 25 at the lower end thereof. The mounting lug 29 is formed to provide a slot-like recess 31 for reception therein of a generally rearwardly extending lip 32. A locking screw 33 extends through aligned openings in the lug 29 and lip 32 and is screw threaded into the lug 29 to secure the front end of the insert 22 in place. The flange 30 is provided with a pair of openings 34 for reception of mounting screws 35 that are screw threaded into a downwardly projecting boss 36 in the housing 1, see particularly FIG. 2.

Figure 4:
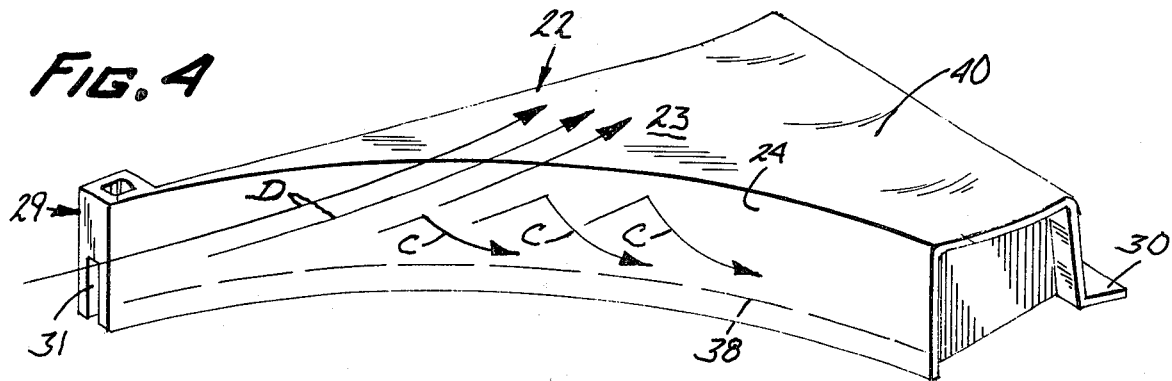
FIG. 4 is a view in perspective of the insert element of this invention as seen from the top and one side.
Figure 5:
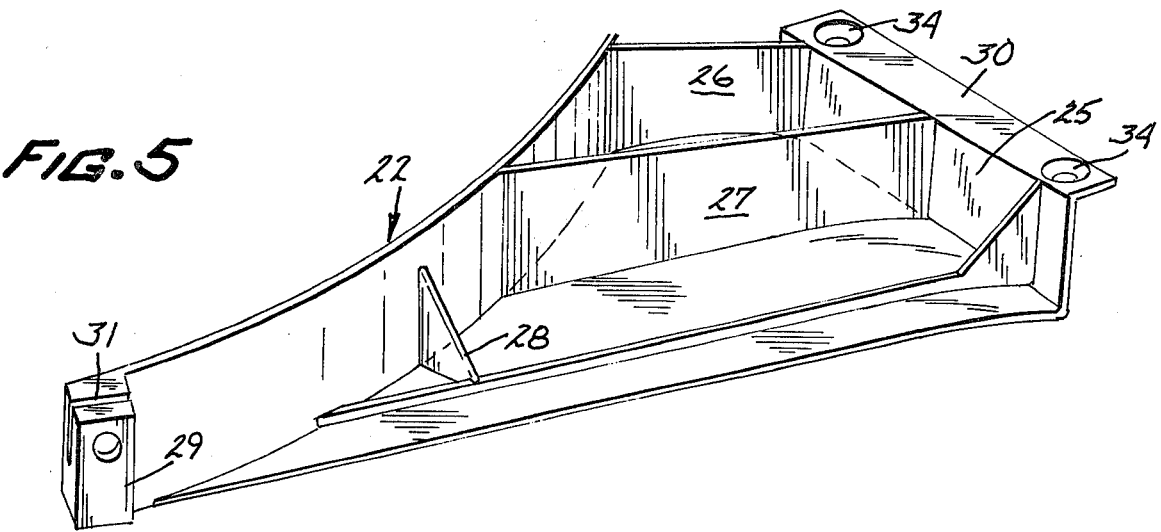
FIG. 5 is a view in perspective of the insert element as seen from the bottom and opposite side thereof.

When the insert element 22 is anchored in place, the upper surface of the top wall 23 forms the bottom wall surface of the discharge chute 17, and the arcuate wall 24 cooperates with the skirt 11 to provide a generally cylindrical inner wall surface 37 that is disposed radially outwardly of the path of rotation of the cutting blade 5. As shown in FIGS. 1 and 3, the arcuate wall 24 is disposed in closely radially outwardly spaced relation to the outer end of the blade 5. The lower edge of the arcuate wall 24 or wall surface 37 is disposed slightly below the plane of the cutting blade 5, this plane being shown by broken lines in FIGS. 2 and 3, and indicated at 38. With reference to FIGS. 2 and 4, it will be seen that the arcuate wall 24 extends upwardly above the plane of the blade 5, the walls 23 and 24 cooperating to define a circumferentially extended sharp corner edge 39. Toward the outer or rear end of the insert element 22, the top wall 23 thereof is formed to provide an arcuate portion 40 that curves gently outwardly and upwardly toward the outer end wall 25, see FIGS. 2, 4 and 5. The radius of the arc of curvature of the wall portion 40 is substantially equal to the length of the closure member 20 between the axis of the pivotal connection 21 and the outer end of the closure member 20. Thus, when the closure member 20 is moved to its closed position, shown by dotted lines in FIG. 2, the outer edge of the closure member 20 will wipe away any clippings which may have lodged on the outer end portion of the top wall 23. Moreover, when the mower is operated with the closure member 20 in its closed position, for mulching or other purposes, escape of clippings through the chute 17 is eliminated.

During operation of the mower above-described, with the closure member 20 in its open position, and the bag 6 attached to the discharge chute 17, substantially all of the grass clippings cut by the blade 5 are propelled tangentially rearwardly through the discharge chute 17 and into the bag 6. It has been found that substantially 95% of the clippings flow through the discharge chute 17 in the area indicated by the arrow A in FIG. 2, and that very close to 5% of the clippings pass through the rear end of the chute 17 in the area indicated by the arrow B. Due to the close relationship between the vertical wall 24 of the insert 22 and the outer end of the cutting blade 5, and due to the vertical extension of the wall 24 terminating in the sharp corner edge 39, any clippings not having sufficient momentum to carry over the top surface 23 of the insert 22 will strike the vertical surface 24 and fall on the blade 5, as indicated by arrows C in FIG. 4. These clippings, which otherwise would dribble to the ground, are carried around by the blade 5 and the air stream created thereby to be blown through the discharge chute 17, as indicated by arrows D in FIG. 4. By cutting off and recycling the relatively few clippings which strike the vertical wall surface 24, I have found that I am able to rotate the cutting blade 5 at substantially lower speeds than heretofore. In practice, a twenty-one inch blade rotating at a speed of approximately 2400 RPM has been found to deliver clippings to the bag 6 with a minimum of dribbling of clippings to the ground, and without bunching or choking of the grass in the discharge chute. This slower speed of rotation of the cutting blade 5 compared to blade speeds heretofore used, in the neighborhood of 3200 RPM, provides for a much higher degree of safety than has heretofore been obtained in rotary mowers, as well as a substantially longer engine life.

While I have shown and described a commercial embodiment of my mower and discharge apparatus, it will be understood that the same is capable of modification and that modification may be made without departure from the spirit and scope of the invention, as defined in the claims.

What is claimed is:

1. In a rotary lawn mower including housing means and a cutting blade disposed in said housing means for rotation on a normally generally vertical axis, said housing means including a top wall and a circumferentially extending skirt depending from said top wall, said top wall having a portion extending generally tangentially relative to said skirt and angularly upwardly to provide top and side wall portions of a discharge chute for grass clippings; an insert element; mounting means for mounting said insert element in the housing in downwardly spaced relationship to the top wall portion of said discharge chute, said insert element having a substantially vertical sidewall surface cooperating with said skirt to define a generally cylindrical inner wall surface radially outwardly of the path of rotation of said blade and extending upwardly from the plane of the blade, said insert element having a normally generally horizontal wall defining a bottom wall surface of said discharge chute; and a closure member having opposite ends, one of which is pivotally mounted in said discharge chute adjacent said top wall thereof for movement of said closure member between an open position in close underlying generally parallel relationship to the top wall of the chute and a closed position, wherein the opposite end substantially engages the generally horizontal wall of said insert element.

2. The mower defined in claim 1 in which said generally horizontal insert wall includes an arcuate portion coinciding substantially with the path of movement of said opposite end of the closure member during said pivotal movement of the closure member.

3. In a rotary lawn mower including housing means and a cutting blade disposed in said housing means for rotation on a normally generally vertical axis, said housing means including a top wall and a circumferentially extending skirt depending from said top wall, said top wall having a portion extending generally tangentially relative to said skirt and angularly upwardly to provide top and side wall portions of a discharge chute for grass clippings; an insert element, and mounting means for mounting said insert element in the housing in downwardly spaced relationship to the top wall portion of said discharge chute, said insert element having a substantially vertical sidewall surface cooperating with said skirt to define a generally cylindrical inner wall surface radially outwardly of the path of rotation of said blade and extending upwardly from the plane of the blade, said insert element having a normally generally horizontal wall defining a bottom wall surface of said discharge chute.

4. The mower defined in claim 3 in which the generally horizontal wall surface and inner wall surface of the insert element cooperate to define a sharp corner edge.

5. The mower defined in claim 3 in which said mounting means includes a portion at one end of said insert element defining a recess for reception of a portion of said housing, and a flange at the opposite end of said insert element adapted to be secured to said housing top wall.

* * * * *